(12) United States Patent
Pien et al.

(10) Patent No.: US 8,826,868 B2
(45) Date of Patent: Sep. 9, 2014

(54) RECIPROCATING INTERNAL COMBUSTION ENGINE

(71) Applicants: Pao Chi Pien, Chevy Chase, MD (US); Paul Shih-Hsi Pien, Bethesda, MD (US)

(72) Inventors: Pao Chi Pien, Chevy Chase, MD (US); Paul Shih-Hsi Pien, Bethesda, MD (US)

( * ) Notice: Subject to any disclaimer, the term of this patent is extended or adjusted under 35 U.S.C. 154(b) by 0 days.

(21) Appl. No.: 13/855,660

(22) Filed: Apr. 2, 2013

(65) Prior Publication Data

US 2013/0255641 A1    Oct. 3, 2013

Related U.S. Application Data

(60) Provisional application No. 61/619,205, filed on Apr. 2, 2012, provisional application No. 61/683,781, filed on Aug. 16, 2012.

(51) Int. Cl.
*F02D 15/00* (2006.01)
*F02D 15/02* (2006.01)

(52) U.S. Cl.
USPC .................. 123/48 R; 123/78 R; 123/295

(58) Field of Classification Search
USPC .... 123/48 R, 48 A, 48 AA, 48 B, 78 R, 78 A, 123/78 AA, 78 B, 78 BA, 78 E, 78 F, 295, 123/305; 701/101–103
See application file for complete search history.

(56) References Cited

U.S. PATENT DOCUMENTS

| | | | |
|---|---|---|---|
| 2,292,233 A | 8/1942 | Lysholm | |
| 2,820,339 A | 1/1958 | Grieshaber et al. | |
| 2,917,031 A | 12/1959 | Nestorovic | |
| 3,093,959 A | 6/1963 | Birmann | |
| 3,125,076 A * | 3/1964 | Mullaney | 123/305 |
| 3,623,463 A | 11/1971 | De Vries | |
| 3,672,160 A | 6/1972 | Kim | |
| 3,808,818 A | 5/1974 | Cataldo | |
| 3,924,576 A | 12/1975 | Siewert | |
| 4,023,365 A | 5/1977 | van Ginhoven | |
| 4,050,420 A | 9/1977 | Cataldo | |
| 4,280,468 A | 7/1981 | Millman | |
| 4,520,765 A | 6/1985 | Gerace | |
| 4,541,246 A | 9/1985 | Chang | |
| 4,663,938 A | 5/1987 | Colgate | |
| 4,783,966 A | 11/1988 | Aldrich | |
| 4,815,423 A | 3/1989 | Holmer | |
| 4,918,923 A | 4/1990 | Woollenweber et al. | |
| 5,033,418 A | 7/1991 | Maissant et al. | |
| 5,117,788 A | 6/1992 | Blaser | |
| 5,228,415 A | 7/1993 | Williams | |
| 5,265,562 A | 11/1993 | Kruse | |

(Continued)

*Primary Examiner* — Mahmoud Gimie (57) ABSTRACT

A compression-ignition constant-volume constant-temperature combustion reciprocating internal combustion engine can operate with a first combustion stage and a second combustion stage. The first combustion stage can be configured to occur at about constant-volume, where a quantity of a first heat addition can be selected to ensure that a first combustion temperature during the first combustion stage does not exceed a threshold temperature at which NOx formation occurs. The second combustion stage can be configured to occur at about a second combustion temperature that remains about constant during the second combustion stage, where the second combustion temperature can be about equal to the first combustion temperature at an end of the first combustion stage, and where a quantity and a rate of a second heat addition delivered to the engine during the second combustion stage can be configured to ensure that the second combustion temperature of the second combustion stage remains about constant during the expansion stroke even as cylinder pressure decreases.

20 Claims, 2 Drawing Sheets

(56) References Cited

U.S. PATENT DOCUMENTS

| | | |
|---|---|---|
| 5,341,771 A | 8/1994 | Riley |
| 5,460,128 A | 10/1995 | Kruse |
| 5,665,272 A | 9/1997 | Adams et al. |
| 6,125,801 A | 10/2000 | Mendler |
| 6,481,206 B1 * | 11/2002 | Pien .................................. 60/620 |
| 6,848,416 B1 * | 2/2005 | Pien ................................ 123/305 |
| 7,360,509 B2 | 4/2008 | Hashimoto et al. |
| 7,424,871 B2 | 9/2008 | Zajac |
| 7,640,911 B2 | 1/2010 | Pien |
| 8,051,827 B1 | 11/2011 | Pien et al. |

* cited by examiner

RECIPROCATING INTERNAL COMBUSTION ENGINE

CROSS-REFERENCE TO RELATED APPLICATIONS

This application claims the benefit of U.S. Provisional Application No. 61/619,205, filed Apr. 2, 2012, and U.S. Provisional Application No. 61/683,781, filed Aug. 16, 2012, both of which are hereby incorporated by reference in their entirety.

FIELD

The present application relates to reciprocating internal combustion engines. More specifically, the present application relates to reciprocating internal combustion engines capable of operating at high efficiencies while producing very low emissions.

BACKGROUND

U.S. Pat. No. 8,051,827, which issued Nov. 8, 2011 and is herein incorporated by reference in its entirety, presents an overexpanded homogeneous charge spark ignition (HCSI) engine. The new HCSI engine is clean burning, while achieving significant increases in efficiency as compared to comparable existing spark ignition engines. Key features of the HCSI engine include reduced combustion temperatures and combustion pressures to reduce coolant load and friction losses and to eliminate NOx formation, and a high expansion ratio to reduce the internal energy of the exhaust gases.

DETAILED DESCRIPTION

The rationale underlying the creation of the HCSI engine has been significantly refined and expanded. More specifically, the reciprocating internal combustion engine (RICE) is treated as a subset of all internal combustion (IC) engines. By reducing the RICE to three (3) energy transformation processes, a new definition of indicated fuel conversion efficiency (IFCE) has been developed. In addition, two (2) equations of state, are presented that in conjunction with the new definition of IFCE, greatly simplify the evaluation and analysis of the RICE, thereby facilitating the creation of new air cycles and new RICEs to operate on those new air cycles.

Figure 1:
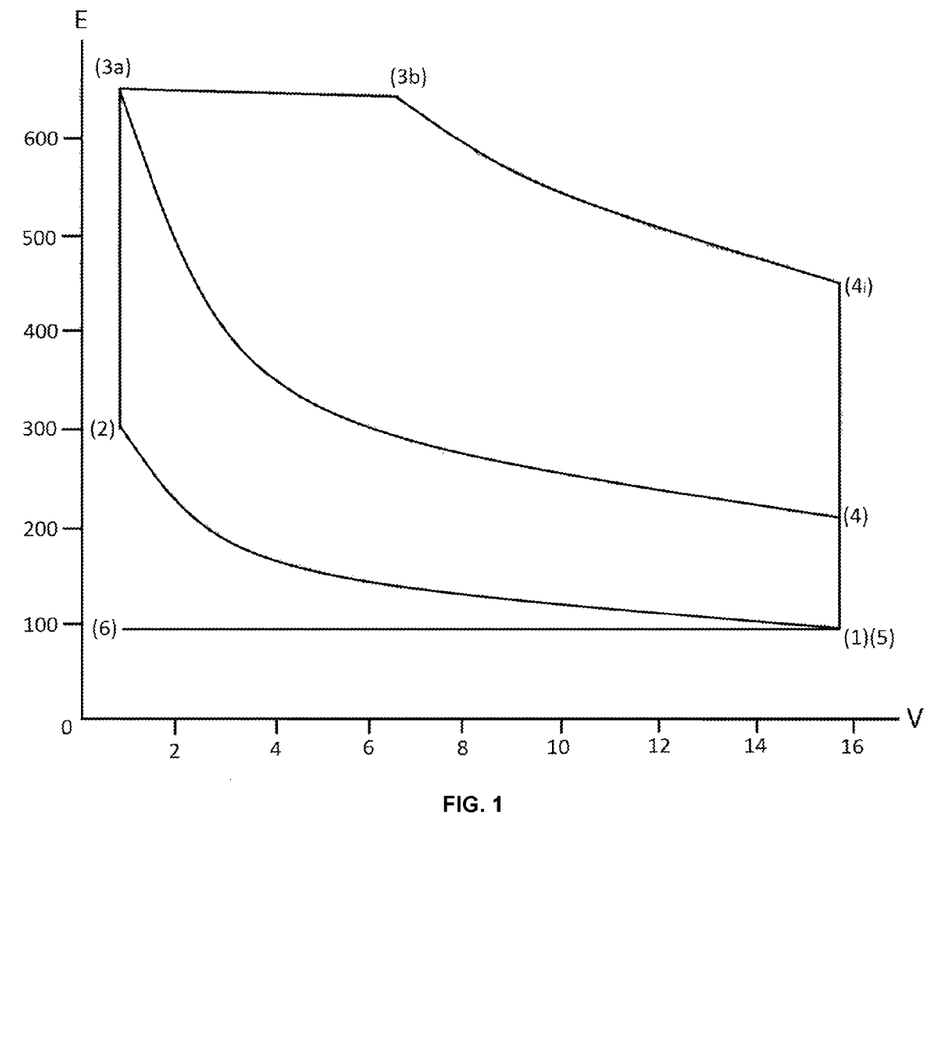
FIG. 1 shows an internal energy-volume diagram of a two-stage constant-volume constant-temperature combustion air cycle (1-2-3a-3b-4i-5-6-1) and a constant-volume combustion air cycle (1-2-3a-4-5-6-1)
Figure 2:
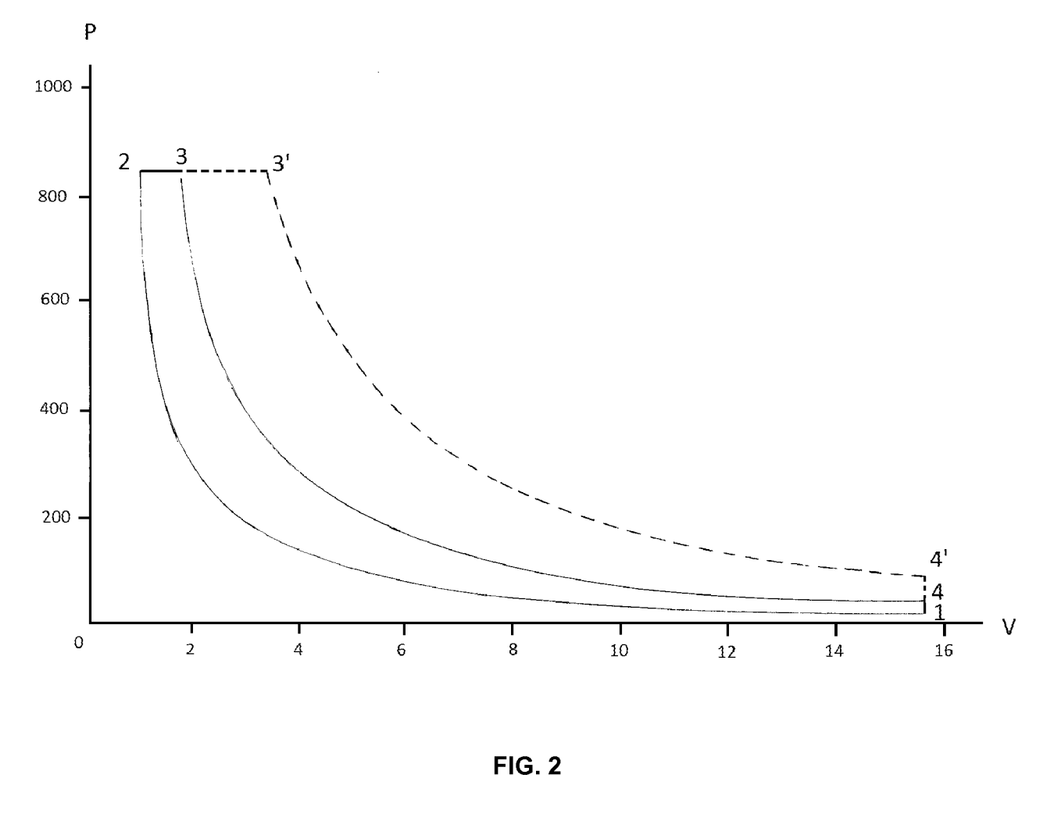
FIG. 2 shows a pressure-volume diagram of a first constant-pressure combustion process air cycle (1-2-3-4-1) and a second constant-pressure combustion process air cycle (1-2-3'-4'-1), where the heat addition (2-3') in the second constant-pressure combustion process air cycle is greater than the heat addition (2-3) in the second constant-pressure.

The concepts described herein and defined by the enumerated claims may be better understood by referring to the following description, which should be read in conjunction with the accompanying figures, such as FIG. 1, which shows an internal energy-volume diagram of a two-stage constant-volume constant-temperature combustion air cycle and FIG. 2, which shows a pressure-volume diagram of a constant-pressure combustion process air cycle. The descriptions of certain embodiments are set out below to enable one to build and use implementations of the invention, and are not intended to limit the enumerated claims, but rather to serve as particular examples thereof. Those skilled in the art should appreciate that they may readily use the conception and specific embodiments disclosed as a basis for modifying or designing other methods and systems for carrying out the same purposes. Those skilled in the art should also realize that such equivalent assemblies do not depart from the spirit and scope of the invention in its broadest form.

The RICE is a subset of IC engines, the operation of which, conceptually, can be greatly simplified. The surrounding cylinder wall of the RICE (with closed intake and exhaust valves), together with its reciprocating piston, form a thermodynamic system that transforms:

i. mechanical work W done by a moving piston into internal energy E of the working fluid during a compression process, ii. heat energy Q converted from fuel chemical energy into increased working fluid internal energy E and total volume V during a combustion process, and iii. a portion of the working fluid internal energy E into mechanical work W during an expansion process.

The remaining portion of the working fluid internal energy E is rejected out of the cylinder at the end of the expansion process. The transformation of energy in each of the three thermodynamic processes is governed by the First Law of Thermodynamics, i.e., that energy is neither created nor destroyed.

Constant Volume Combustion Process:

When the RICE is viewed as a series of three (3) basic energy transformation processes, a simpler and more useful alternative definition of IFCE can be developed. This approach assumes that both the compression and expansion processes are adiabatic and reversible. Consequently, there is no heat lost during either the compression or expansion processes, so the change in internal energy between two states is equal to the work input or output during the compression and expansion processes, respectively: $dE=dq-pdV=0-pdV=-W$. Since work is not a state function, we typically need to know the path between two states (i.e. pressure and temperature data between two states) to determine work. However, as a result of the assumptions described above, it is unnecessary to know the pressure and temperature paths between two states to determine the amount of work input during the compression process or the amount of work output during the expansion process. Rather, work can simply be calculated as the change in internal energy between two states.

For a constant-volume cycle 1-2-3-4-1, compression process 1-2 increases E1 to E2. A combustion process increases E2 with the addition of Q to E3. Expansion process 3-4 reduces E3 to E4 and transforms E3-E4 into mechanical work W, with E4 being rejected from the cylinder at point 4. The total internal energy input is equal to E2+Q. E4 is the total internal energy input (E2+Q) not transformed into mechanical work. Therefore, E2+Q−E4 is internal energy output, and the IFCE is equal to:

$$\eta_{f,i}=(E_2+Q-E_4)/(E_2+Q)(\text{output/input}); \text{ or}$$

$$\eta_{f,i}=1-E_4/(E_2+Q)(\text{the "IE Balance Equation"}).$$

Significantly, because internal energy E is a state variable and Q is known, the application of the IE Balance Equation to the RICE overcomes the difficulty and complexity of applying non-equilibrium thermodynamics to analyze and evaluate the potential performance of the RICE.

Importantly, while energy cannot be created or destroyed, energy can be transformed from one form to another. Such transformations of energy from state (1) to state (2) conform to the following two equations of state:

$$pV = mRE \quad \text{(Eqn. 1)}$$

$$E_2/E_1 = (V_1/V_2)^{k-1} \quad \text{(Eqn. 2)}$$

In the foregoing expressions, V is the total volume of gas and E is the total gas internal energy contained in V. Both E and V are state variables. These two equations describe fully the transformations of energy from one form to another that take place during the compression, combustion, and expansion processes of the RICE. It should be noted that in Equation 1, "R" is a constant and has no dimension. For a compression or expansion process, $p_2 = p_1(V_1/V_2)(E_2/E_1)$. For a constant-volume combustion process, $p_2 = p_1(E_2/E_1)$, and for a constant-temperature (constant E) combustion process, $p_2 = p_1(V_1/V_2)$. Moreover, since pressure p is a function of state variables E and V, in Equation 1, p also functions as a state variable.

The second state equation (Equation 2) sets forth the relationship between the energy transformation between mechanical work W done and cylinder gas internal energy E. The first state equation (Equation 1) states the relationship between the heat energy Q and the increase in cylinder gas internal energy E and the increase in volume V. These two equations of state (i.e. Equations 1 and 2) can be applied to calculate the cylinder gas internal energies at the beginning and end of the compression, combustion, and expansion processes. Utilizing these two state equations, together with the IE Balance Equation, the computation of IFCE of the RICE is reduced to calculating the cylinder gas internal energy $E_1$ at the beginning of the compression process, $E_2$ at the end of compression process, $E_3$ and $V_3$ at the end of combustion process, and $E_4$ at the end of expansion process.

The equation of state that relates state variables E and V is derived utilizing both the law of mechanics and the law of conservation of energy. According to the law of mechanics, when a moving piston of the RICE compresses cylinder gases from $V_0$ to V, the compression work W done is the definite integral of pdV from $V_0$ to V with p equal to the average pressure within the volume. Regardless of the actual p distribution, the average pressure p is equal to $p_0(V_0/V)^k$. At $V_0$, W is zero. The compression work W done is:

$$W = p_0(V_0)^k (1/V)^{k-1}/(1-k) \quad \text{(Eqn. 3)}$$

and, $$E = W/J = p_0(V_0)^k/(1-k)(1/V)^{k-1}/J \quad \text{(Eqn. 4)}$$

then, $$E_2/E_1 = (V_1/V_2)^{k-1} \quad \text{(Eqn. 5)}$$

Equation 3 describes compression work W done and is derived from the law of mechanics. Equation 4 is derived from the law of conservation of energy. Equation 5 is obtained by taking the ratio of two internal energies at two different volumes and is the equation of state that relates the two state variables E and V.[1]

[1] An alternative derivation of Equation 5 is set forth in U.S. Pat. No. 8,051,827. The derivation set forth above is preferable, because it does not involve temperature "T" which is not in equilibrium.

When $V_1$ is greater than $V_2$, compression work W done by the reciprocating piston is transformed into working fluid internal energy E. When $V_1$ is smaller than $V_2$, diminishing working fluid internal energy E is transformed into expansion work W done on the moving piston. Thus, Equation 5 expresses the energy transformation between mechanical work W done (measured by total volume V change) and the change in total internal energy E. If $E_1$ and $V_1$ at state 1 are known, $E_2$ can be computed from $V_2$, and vice versa.

The second state equation, which relates heat energy Q and the increase in cylinder gas internal energy E and the increase in total volume V, is derived from and based on the perfect gas state equation. A perfect gas, which has a constant specific heat, follows the perfect gas law:

$$pV = mRT \quad \text{(Eqn. 6)}$$

Equation 6, however, is not a state equation, because T is not a state variable. Equation 6 becomes an equation of state only after the gas reaches equilibrium. By utilizing internal energy E, which is a state variable, the following Equation (7) is an equation of state, the application of which does not require the gas to reach equilibrium:

$$pV = mR'E \quad \text{(Eqn. 7)}$$

where E is equal to $c_v T$ and R' is equal to $R/c_v$ and p is the average gas pressure. The application of Equation 7 is discussed below.

Simplifying the RICE to a series of basic energy transformation processes provides the clarity to create new approaches to improving the efficiency of the RICE. The creation of a new definition of IFCE based on internal energy balance, together with the two new equations of state (i.e. Equations 1 and 2), provide the tools for evaluating those new approaches as well as existing RICE designs. Creating RICE designs with a high IFCE is the first step in creating real RICEs with the potential to outperform existing RICE designs. Utilizing new RICE designs with high IFCEs, it is possible to create new RICEs with high potential brake fuel conversion efficiency (BFCE) that are also clean burning.

To that end, two (2) new air cycles have been created upon which two (2) new RICE designs operate. The new air cycles seek to maximize IFCE, while the new RICE designs also seek to greatly reduce combustion temperature and combustion pressure as compared to existing RICEs. By reducing combustion temperature and combustion pressure, energy lost to coolant load and friction are greatly reduced, contributing to achieve significant increases in BFCE as compared to existing RICEs. Equally important, lower combustion temperatures also reduce NOx emissions.

Constant-Volume Constant-Temperature Combustion Process

A new constant-volume constant-temperature two-stage combustion air cycle has been created upon which the new compression-ignition constant-volume constant-temperature (CI-CVCT) combustion process RICE operates. As shown in FIG. 1, a two-stage combustion air cycle begins with a compression process 1-2, followed by a constant-volume combustion process 2-3a. A first heat addition $Q_{first}$ occurs during the constant-volume combustion process 2-3a and is limited to ensure that the combustion temperature at the end of this process is below the temperature at which NOx forms. To meet higher loading and torque requirements, the constant-volume combustion process 2-3a can be followed by a constant-temperature combustion process 3a-3b involving a second heat addition $Q_{second}$. During the constant-temperature combustion process, the amount of heat added and the rate of heat addition can be controlled to ensure that the combustion temperature during this second combustion stage remains approximately constant and does not increase above a threshold temperature where NOx begins to form. The constant-temperature combustion process is followed by an expansion process 3b-4i. An exhaust process 4i-5-6 and an intake process 6-1 complete the constant-volume constant-temperature two-stage combustion process air cycle.

FIG. 1 illustrates how the CI-CVCT two-stage combustion process limits temperature to below a given design temperature. In the case of a CI-CVCT RICE, the maximum combustion temperature is limited to below the threshold temperature at which NOx formation takes place. When the two-stage combustion process shown in FIG. 1 is compared to an E-V diagram for a single-stage constant-volume combustion process that has only a single heat addition ($Q_{single-stage}$) equal to the sum of the first and second heat additions of the two-stage combustion process (i.e. $Q_{single-stage} = Q_{first} + Q_{second}$), the maximum combustion temperature and pressure of the single-stage combustion process would be much higher than the maximum combustion temperature and pressure of the two-stage combustion process. The lower combustion temperatures and pressures of the two-stage CI-CVCT cycle not only eliminate NOx formation, but also reduce coolant load and friction loss. A high compression ratio ensures complete combustion of the injected fuel, further reducing emissions.

To illustrate the potential performance of the new two-stage combustion air cycle, a compression ratio of 18.0 is selected. Referring to the E-V diagram shown in FIG. 1, at state (1), $E_1 = c_v T_1 = 95.73$ Btu, $T_1 = 311°$ K, and $p_1 = 14.7$ psia. At state (2), the end of the compression process 1-2, $E_2 = E_1(18)^{0.4} = 304.2$ Btu and $V_2 = 15.6/18 = 0.867$ ft$^3$, $p_2 = p_1(V_1/V_2)(E_2/E_1) = 840.8$ psia and $p_2 V_2 / E_2 = 2.39$. For the constant-volume combustion process 2-3a, the upper limit of $E_{3a}$ is the temperature $T_{3a}(E_{3a}/c_v)$ that is slightly less than the point at which NOx formation is detected. The actual upper limit of $E_{3a}$ will depend on the engine configuration and type of fuel used.

For purposes of this discussion, at state (3a) $E_{3a} = 650$ Btu is assumed to be the upper limit. Then, $P_{3a} = p_2(E_{3a}/E_2) = 1796$ psia and $p_{3a} V_{3a} / E_{3a} = 2.39$. The first stage of fuel injection (for constant-volume combustion) ends when $E_{3a} = 650$ Btu. When $E_{3a}$ is less than 650 Btu, the expansion ratio $V_4/V_{3a}$ is 18.0. At state 4, $E_4 = E_{3a}(1/18)^{0.4} = 204.6$ Btu, $p_4 = p_3(V_3/V_4)(E_4/E_3) = 1796(204.6/650)/18 = 31.4$, and $p_4 V_4 / E_4 = 2.39$. The IFCE of the constant-volume combustion portion of the two-stage combustion cycle with a compression ratio of 18.0 is equal to $1 - E_4/E_{3a} = 1 - 0.315 = 0.685$. The IFCE is computed based on the conservation of energy law alone using the IE Balance Equation.

To meet additional loading and torque requirements, the constant-volume combustion process can be followed by a second constant-temperature combustion stage. The procedure for computing the required second heat addition $Q_{second}$ and rate of heat addition, for achieving a constant-temperature combustion process is shown in Table 1 below:

Row 1 ("$V_{3b}$") is the cylinder volume during the heat addition of the constant-temperature combustion process, and falls on the line extending between 3a and 3b in FIG. 1. In FIG. 1, 3b is located at $V_{3b} = 6.59$. However, in other embodiments, 3b could be located at any cylinder volume between $V_{3a}$ and $V_{3b}$. Row 2 ("$E_x$") is the internal energy if no heat is added and corresponds to points along the line extending from 3a to 4 in FIG. 1. Row 3 ("$Q_{3a-3b}$") is the heat addition required to keep the internal energy $E_{3b}$ that is listed in Row 4 at a constant combustion temperature, where $T_{3b} = E_{3b}/cv$. Row 5 ("$Q_{2-3b}$") is the total heat addition and is equal to the first heat addition $Q_{first}$ plus $Q_{3a-3b}$. Row 6 ("$P_x$") is the air pressure without a second heat addition. Row 7 ("$P_{3b}$") is the air pressure after the second heat addition. Row 8 is the total internal energy input. Row 9 ("$E_4$") is the internal energy not converted into useful work. Row 10 ("$p_4$") is the exhaust pressure. Row 11 ("PV/E") is a constant. Slight variations in the values in Row 11 are due to numerical rounding. Row 12 is the IFCE of the new constant-volume constant-temperature two-stage combustion air cycle. Columns 4 through 8 are computed in the same manner as the computations in Column 3.

While it is not possible to easily calculate the BFCE of a CI-CVCT RICE, a rough estimate of the potential BFCE of the new engine can be made based on the generally accepted BFCE values of existing gasoline engines. More specifically, the difference between IFCE and BFCE is generally attributed to the sum of heat loss and friction loss. Since Equations 5 and 7 are equations of state, they can be applied to evaluate actual RICEs without requiring gas density or internal energy distributions to reach equilibrium. Accordingly, these state equations can also be used to compute the BFCE of a compression-ignition engine. For a gasoline engine operating on an ideal constant-volume air cycle with a compression ratio of 10.0, $E_1 = 95.73$, $E_2 = E_1(10)^{0.4} = 240.5$ Btu and $p_2 = p_1(10)^{1.4} = 369.2$ psia. E3=E2+1200=1440. For a real gasoline engine, because the working fluid contains a large amount of exhaust gas, the specific heat ratio of the engine is assumed to be 1.3 rather than of 1.4. With these assumptions, $E_4 = E_3(1/10)^{0.3} = 721.7$ and the IFCE of the gasoline engine is calculated to be $1 - 721.7/1440 = (1/10)^{0.3} = 0.50$. Assuming a BFCE of 0.25 for this engine (a BFCE that is often cited for existing spark-ignition RICEs), the sum of heat loss and friction loss=IFCE−BFCE=0.25.

For a CI-CVCT RICE, at state (3a), $E_{3a} = 304.2 + 300 = 604.2$ Btu. The normal operating upper limit, $T_{3a} = 1963°$ K, and $p_{3a} = p_2 (604.2/304.2) = 1670$ psia. The combustion temperature difference ratio and combustion pressure difference ratio between the new engine and the representative gasoline engine are 0.37 (1963−360)/(4678−360) and 0.76 (1670/2211), respectively. The sum of heat loss and friction loss of

TABLE 1

| 1 | $V_{3b}$ | 0.867 | 1.30 | 1.95 | 2.93 | 4.39 | 6.59 |
|---|---|---|---|---|---|---|---|
| 2 | $E_x$ | 650 | 552.8 | 470 | 399.4 | 339.7 | 288.8 |
| 3 | $Q_{3a-3b}$ | 0 | 97.2 | 180 | 250.6 | 310.3 | 361.2 |
| 4 | $E_{3b}$ | 650 | 650 | 650 | 650 | 650 | 650 |
| 5 | $Q_{2-3b}$ | 345.8 | 443.0 | 525.8 | 596.4 | 656.6 | 707.0 |
| 6 | $P_x$ | 1796 | 1198 | 798.5 | 531.4 | 354.7 | 236.3 |
| 7 | $P_{3b}$ | 1796 | 1409 | 1104 | 864.8 | 678.7 | 531.8 |
| 8 | $E_2 + E_{3b}$ | 650 | 747.2 | 830 | 900.6 | 960.3 | 1011 |
| 9 | $E_4$ | 204.6 | 240.6 | 283.0 | 333.0 | 391.4 | 460.5 |
| 10 | $p_4$ | 31.4 | 36.9 | 43.4 | 51.1 | 60.1 | 70.7 |
| 11 | PV/E | 2.394 | 2.393 | 2.393 | 2.396 | 2.396 | 2.396 |
| 12 | IFCE | 0.685 | 0.678 | 0.659 | 0.630 | 0.592 | 0.545 | the new engine is equal to 0.37×0.167+0.76×0.083=0.092. The estimated BFCE=0.685−0.092=0.593 at the normal engine operating range.

The new engine's estimated BFCE of 0.593 at the normal operating range can be attributed to the high expansion ratio which increases IFCE by 0.185 (0.685−0.50), a reduced "k" value due to the absence of exhaust gas recirculation (EGR), and the remaining 0.158 increase in BFCE attributable to reduced combustion temperature and combustion pressure. For the second stage constant-temperature combustion process, the combustion temperature is kept constant at 1963° K and the combustion pressure is 1670(0.867/4.39)=329.8 psia. The combustion temperature difference ratio and combustion pressure difference ratio for the second stage combustion are 0.37 (1963−360)/(4678−360) and 0.16 (354.8/2211), respectively. The sum of heat loss and friction loss of the new engine is equal to 0.37×0.167+0.16×0.083=0.075 and the estimated second stage constant-temperature combustion BFCE=0.643−0.075=0.568.

The new CI-CVCT RICE employs a high compression ratio together with combustion temperatures throughout the combustion processes that are below the critical temperature at which NOx forms to produce a high IFCE, while minimizing emissions and preventing NOx formation. At a compression ratio of 18.0, air flow is increased by 1.049 ((15.6−0.867)/(15.6−1.56)) times as compared to air flow with a compression ratio of 10.0. The indicated power ratio is equal to 1.049 (0.685/0.50)=1.44, or a 31% (1/1.44) potential downsizing.

The potential performance of a CI-CVCT RICE can be confirmed by conducting relatively simple engine tests or numerical computations. In one example, an existing compression-ignition test engine is modified to obtain a compression ratio of 18.0. The engine test setup is equipped with the capability to deliver two stages of fuel injection. The first stage $Q_{2-3a}$ is for constant-volume combustion process which has an upper limit of $E_{3a}$=650 Btu. The second-stage constant-temperature process is added when the torque/power requirement is higher than 650 Btu (for the first-stage constant-volume combustion process). A jerk fuel injection pump can be modified to have two helical grooves with different pitches. The second helical groove pitch is based on the heat addition rate shown in Row 3 in Table 1 such that the capability to deliver two stages of fuel injection can be provided. Alternately, a high-pressure common-rail fuel injection system can be employed. The common-rail fuel system can include a high-pressure fuel pump that pressurizes and delivers fuel to the common-rail. The fuel system can include one or more fuel injectors fluidly connected to the common-rail by a high-pressure fuel line and configured to inject pressurized fuel into a cylinder of the CI-CVCT RICE. Each fuel injector can include a solenoid valve that permits rapid on and off switching, thereby enabling one or more fuel injections, which can each have variable rates of fuel delivery, during the constant-temperature combustion process shown in FIG. 1 and corresponding to the heat additions listed in Row 3 of Table 1. The timing, duration, and rate of each fuel injection (i.e. heat addition) can be controlled with an engine control unit (ECU) that is electrically connected to each fuel injector and to the high-pressure fuel pump.

A method for designing a reciprocating internal combustion engine can be based on the Law of Conservation of Energy, which states energy cannot be created or destroyed. The method can also be based on the fact that while energy cannot be created or destroyed, energy can be transformed from one form to another. The method for designing the reciprocating internal combustion engine can be based on an approach that treats its operation as a series of energy transformations, including: (1) transforming mechanical work W done by a moving piston into internal energy E of the working fluid during a compression process; (2) transforming heat energy Q converted from fuel chemical energy into increased working fluid internal energy E and total volume V during a combustion process; (3) transforming a portion of the working fluid internal energy E into mechanical work W during an expansion process; and (4) rejecting a remaining portion of the working fluid internal energy E from the cylinder at the end of an expansion process.

A method for designing a reciprocating internal combustion engine can include calculating indicated fuel conversion efficiency according to the equation: 1−E4/(E2+Q). This method can utilize two equations of state to apply this definition of indicated fuel conversion efficiency, and those equations of state can include Equations 1 and 2 described herein. In these equations of state, V is the total volume of gas and E is the total gas internal energy contained in V, where both E and V are state variables facilitating the straightforward calculation of E2 and E4 for a given engine design and in turn facilitating the application of the alternative definition of indicated fuel conversion efficiency (i.e. IFCE=1−E4/(E2+Q)).

The creation of an internal energy-volume (E-V) diagram, such as the diagram shown in FIG. 1, can provide guidance in the development of design criteria for creating fuel-efficient reciprocating internal combustion engines.

In one example, a method for designing a reciprocating internal combustion engine can include estimating BFCE by defining the difference between BFCE and IFCE as attributable to energy losses due to heat losses to coolant load and friction. In another example, a method for computing BFCE of a given reciprocating internal combustion engine design can include estimating the relative amounts of heat loss and friction loss of the engine as compared to the known or assumed BFCE of existing engines.

In yet another example, a method for operating a compression-ignition reciprocating internal combustion engine can include injecting a first quantity of fuel into a cylinder of the engine during a compression stroke of the engine to produce a first compression-ignition combustion event while a reciprocating piston is at top dead center in the cylinder, and injecting a second quantity of fuel into the cylinder during an expansion stroke of the engine to produce a second combustion event while the reciprocating piston is descending from top dead center, where injecting the second quantity of fuel has a start and an end, where injecting the second quantity of fuel is configured to maintain a constant mean cylinder gas temperature between the start and the end of injecting the second quantity of fuel, where injecting the second quantity of fuel has an injection rate, and where the injection rate increases between the start and the end of injecting the second quantity of fuel to ensure that the mean cylinder gas temperature remains constant despite the reciprocating piston descending in the cylinder during the expansion stroke. The mean cylinder gas temperature of the second combustion event can be below about 2400 degrees Fahrenheit. The start of injecting the second quantity of fuel can occur when the reciprocating piston is at about top dead center. The end of injecting the second quantity of fuel can occur when the reciprocating piston has completed about 3%, 7%, 14%, 24%, or 39% of the expansion stroke, and the second quantity of fuel can be equal to about 28%, 52%, 72%, 90%, or 104%, respectively, of the first quantity of fuel. The engine can have a compression ratio between about 16 and 20.

In still another example, a compression-ignition reciprocating internal combustion engine can include a first fuel injector configured to inject a first quantity of fuel into a cylinder of the engine during a first injection event that occurs during a compression stroke of the engine to produce a first compression-ignition combustion event while a reciprocating piston is at top dead center in the cylinder. The engine can also include a second fuel injector configured to inject a second quantity of fuel into the cylinder during an expansion stroke of the engine to produce a second combustion event while the reciprocating piston is descending from top dead center, where the second quantity of fuel is injected into the cylinder during a second injection event having a start and an end, and where the second injection event has an injection rate configured to maintain a constant mean cylinder gas temperature between the start and the end of the second injection event. The injection rate of the second injection event can be configured to maintain the constant mean cylinder gas temperature below about 2400 degrees Fahrenheit between the start and the end of the second injection event. The end of the second injection event can be configured to occur when the reciprocating piston has completed about 3%, 7%, 14%, 24%, or 39% of the expansion stroke, and where the second quantity of fuel is configured to equal to about 28%, 52%, 72%, 90%, or 104%, respectively, of the first quantity of fuel. The engine can have a compression ratio between about 16 and 20.

A method for designing a reciprocating internal combustion engine operating on an air cycle 1-2-3-4-1 can include: selecting a compression ratio that maximizes internal energy of a working fluid in the engine at an end of a compression stroke; selecting an expansion ratio that minimizes internal energy of the working fluid at an end of an expansion stroke; selecting an upper limit combustion temperature for normal engine operation that is below the threshold temperature at which NOx formation occurs; and selecting an amount of heat addition and a rate of heat addition, wherein the amount of heat addition and the heat addition rate are selected to ensure that an upper limit combustion temperature is not exceeded, and wherein the amount of heat addition and the rate of heat addition are selected to ensure that an upper limit combustion pressure is not exceeded. The step of selecting a compression ratio that maximizes internal energy of the working fluid in the engine at the end of the compression stroke can include selecting a compression ratio to obtain a compression temperature sufficiently high to minimize ignition delay and to ensure fast and complete burning of the fuel. The method can also include selecting a fuel equivalence ratio to obtain a combustion temperature below a threshold temperature at which NOx formation takes place. The step of selecting an expansion ratio that minimizes internal energy of the working fluid at the end of the expansion stroke can include selecting an expansion ratio that provides high indicated fuel conversion efficiency without excessive friction losses. The compression ratio, fuel equivalence ratio, and expansion ratio can each be selected to minimize specific fuel consumption and emissions.

For the constant-volume combustion cycle (1-2-3a-4-5-6-1) shown in FIG. 1, an adiabatic, reversible compression process 1-2 increases the internal energy from $E_1$ to $E_2$. A constant-volume combustion process 2-3a increases the internal energy from $E_2$ to $E_{3a}$ through a heat addition Q. An expansion process 3a-4 reduces the internal energy from $E_{3a}$ to $E_4$ and produces mechanical work W, where $W=E_{3a}-E_4$ for an adiabatic reversible expansion process. Then, internal energy $E_4$ is rejected from the cylinder during a constant-volume heat rejection process. The total internal energy input to the cycle is equal to $E_2+Q$, and the total internal energy produced during the cycle is equal to $E_{3a}-E_4$. Therefore, the IFCE is equal to work output divided by energy input: $\eta_{f,i}=$ (work output/energy input)$=\eta_{f,i}=(E_{3a}-E_4)/(E_2+Q)$).

A compression-ignition constant-volume constant-temperature two stage combustion reciprocating internal combustion engine can include: a first combustion stage configured to occur at about constant-volume, where a quantity of a first heat addition is selected to ensure that a first combustion temperature during the first combustion stage does not exceed a threshold temperature at which NOx formation occurs; and a second combustion stage configured to occur at about a second combustion temperature that remains about constant during the second combustion stage, where the second combustion temperature is about equal to the first combustion temperature at an end of the first combustion stage, where a quantity and a rate of a second heat addition delivered to the engine during the second combustion stage are configured to ensure that the second combustion temperature of the second combustion stage remains about constant during the expansion stroke even as cylinder pressure decreases. The compression ratio can be equal to the expansion ratio, and where the compression ratio can be between about 16 and 20. The engine can be configured to operate on a four-stroke cycle or a two-stroke cycle. The first combustion stage can be configured to meet a target loading requirement while the engine is operating at a fuel equivalence ratio of about 0.288 or below. The first combustion temperature can be configured to remain below a NOx formation temperature during the first combustion stage, and where an equivalence ratio calculated during the first combustion temperature can be configured to remain below a NOx formation equivalence ratio. The engine can be created by retrofitting an existing four-stroke diesel engine to operate on the constant-volume constant-temperature two-stage combustion process, and the retrofitting can include reducing a cylinder clearance volume of the existing four-stroke diesel engine to obtain a compression ratio of about 18.0.

Constant-Pressure Combustion Process

A compression-ignition constant-pressure combustion process (CICP) air cycle has also been created. FIG. 2 presents two P-V diagrams of the CICP air cycle. A compression-ignition combustion process 2-3 begins at the end of a compression process 1-2. A compression ratio sufficiently high to minimize ignition delay and to ensure complete and rapid burning of the injected fuel is selected. The high compression ratio has a matching high expansion ratio for maximizing IFCE. The value of a heat addition Q is determined by the power and torque requirements being placed on the engine. A constant-pressure combustion process 2-3 is obtained by designing the cam profile of the cam shaft of a fuel injection pump to ensure that the rate at which the fuel burns is proportional to the rate at which the cylinder volume increases during the expansion stroke 3-4. Similarly, other fuel injection systems, such as high-pressure common-rail fuel injection system described above, can also be used to achieve a constant-pressure combustion process by ensuring that the rate at which fuel burns is proportional to the rate at which cylinder volume increases during the expansion stroke.

The performance of a representative design example of the CICP air cycle 1-2-3-4-1, is analyzed by using the IE Balance Equation and the two (2) state equations discussed previously. At state 1, $E_1=cvT_1=95.73$ Btu. Equation 5 is used to compute $E_2$ at the end of compression process 1-2 and $E_3=E_2+Q/k$ for the constant-pressure combustion process. Then Equation 7 is applied to compute $V_3$ at the end of constant-pressure combustion process 2-3. Equation 5 is used to compute $E_4$ at the end of expansion process 3-4. A relatively high compression ratio of 18 is chosen to achieve a high compression temperature to minimize ignition delay and to ensure that fuel burning is fast and complete. At state 1, $V_1$=15.6, $T_1$=311° K, and $p_1$=14.7 psia. $E_1$=$cvT_1$=95.73 Btu. At state 2, $V_2$=1.56/18=0.867, $T_2$=988.3, $p_2$=840.8 psia, and $E_2$=$E_1(V_1/V_2)^{k-1}$=304.2 Btu.

The required heat input Q for the combustion process is determined by the required power output. For a required power of one-third load, Q is about 400 Btu. A constant-pressure combustion process is achieved by ensuring that the rate of fuel burning is proportional to the rate of cylinder gas volume increase during the expansion stroke. At state 3, $E_3$=$E_2$+Q/k=304.2+400/1.4=589.9 Btu, and $V_3$=$V_2(E_3/E_2)$=0.867(589.9/304.2)=1.68 ft³. $E_4$=$E_3(V_3/V_4)^{k-1}$=241.9 Btu. Utilizing the IE Balance Equation, the IFCE=$1-E_4/(E_2+Q)$=1−241.9/(304.2+400)=65.6%.

Assuming that the BFCE of an existing RICE is about 0.25; then the sum of heat loss to coolant load and friction loss is equal to 0.352 (0.602−0.25). Approximately 0.117 of the 0.352 is friction loss (about one-third) and 0.234 (about two-thirds) is direct heat loss to coolant. The estimated BFCE of the CICP air cycle is equal to the IFCE minus the sum of heat loss to coolant and friction loss. The pressure ratio and temperature difference ratio between a constant-pressure combustion air cycle at one-third load and a constant-volume combustion air cycle at full load are 0.380 (840.8/2212) and 0.360 (1917−360)/4680−360), respectively. The sum of heat loss and friction loss of the CICP RICE engine is 0.360×0.234+0.380×0.117=0.128. For the CICP RICE at one-third load, the estimated BFCE is equal to 0.528=(0.656−0.128). The BFCE ratio between a constant-volume combustion cycle engine at full load and a constant-pressure combustion cycle engine at one-third load is 0.473 (0.25/0.528), corresponding to a greater than 50% reduction in fuel consumption for the engine operating at about one-third load, as well as greenhouse gases (GHG) for the constant-pressure cycle operating at one-third of full load.

At full load, Q=1200 Btu. At state 3, $E_3$=$E_2$+Q/k=304.2+1200/1.4=1161 Btu, $T_3$=$E_3$/cv=3772° K, and $V_3$=$V_2(E_3/E_2)$=0.867(1161/304.2)=3.31 ft³. $E_4$=$E_3(V_3/V_4)^{k-1}$=1161(3.31/15.6)^{0.4}=624.5 Btu. IFCE=$1-E_4/(E_2+Q)$=1−624.5/(304.2+1200)=58.5%, which is slightly higher than 50% of a constant-volume combustion cycle engine. The new CICP RICE achieves extremely high efficiency at one-third or lower loading and can provide full load power in the rare instances (and short durations) full load power is required at only slightly lower IFCE and some NOx formation.

An existing four-stroke diesel engine can be easily retrofitted to operate on a constant-pressure compression ignition combustion process. First, the cylinder clearance volume of the existing engine is reduced to obtain a compression ratio of 18.0. Second, the cam profile of the jerk fuel injection pump is modified based on the engine experimental results to provide desired rates and timing of fuel delivery to the cylinder. Such a retrofitted engine will be fuel-flexible as commonly used fuels, such as diesel fuel, gasoline, methane, propane, compressed natural gas, etc., that are injected into compressed air with a temperature of about 988.3° K will ignite immediately. A sizable reduction of fuel consumption and GHG emissions can be obtained without any further engine modification.

The constant-pressure combustion cycle engines set forth herein can be applied to further enhance the performance of the HCSI engine set forth in U.S. Pat. No. 8,051,827. Specifically, a constant-pressure combustion process is added at the end of the constant-volume combustion (at point 3a in FIG. 1) when additional loading needs dictate. The IFCE of the additional constant-pressure combustion process can be calculated utilizing the IE Balance Equation and the two equations of state. Since $E_4$ and $V_4$ are state variables defining state 2 of the constant-pressure combustion process air cycle 1-2-3-4-1 (for the additional constant-pressure combustion process), with $V_2$ and $E_2$ equal to $V_4$ and $E_4$ respectively, then, $E_3$=$E_2$+800/k=678.9+571.4=1250 Btu and $V_3$=$V_2(E_3/E_2)$=1.076(1250/678.9)=1.98. At state 4, $E_4$=$E_3(V_3N_1)^{k-1}$=1250(1.98/15.6)0.3=672.9 and IFCE equal to $1-E_4/(768.9+800)$=1−672.9/1479=0.545. The HCSI engine achieves high efficiency while operating at or below one-third of full load and can operate when desirable at full load power with only slightly lower fuel efficiency and some NOx formation.

What is claimed is:

1. A method for designing a reciprocating internal combustion engine operating on an air cycle, the method comprising:
    selecting a compression ratio that maximizes internal energy of a working fluid in the engine at an end of a compression stroke;
    selecting an expansion ratio that minimizes internal energy of the working fluid at an end of an expansion stroke;
    selecting an upper limit combustion temperature for normal engine operation that is below a threshold temperature at which NOx formation occurs; and
    selecting an amount of heat addition and a rate of heat addition, wherein the amount of heat addition and the rate of heat addition are selected to ensure that the upper limit combustion temperature is not exceeded, and wherein the amount of heat addition and the rate of heat addition are selected to ensure that an upper limit combustion pressure is not exceeded.

2. The method of claim 1, wherein the step of selecting the compression ratio that maximizes internal energy of the working fluid in the engine at the end of the compression stroke comprises selecting the compression ratio to obtain a compression temperature sufficiently high to minimize ignition delay and to ensure fast and complete burning of the fuel.

3. The method of claim 1 further comprising selecting a fuel equivalence ratio to obtain a combustion temperature below the threshold temperature at which NOx formation takes place.

4. The method of claim 1, wherein the step of selecting the expansion ratio that minimizes internal energy of the working fluid at the end of the expansion stroke comprises selecting the expansion ratio that provides high indicated fuel conversion efficiency without excessive friction losses.

5. The method of claim 3, wherein the compression ratio, the fuel equivalence ratio, and the expansion ratio are each selected to minimize specific fuel consumption and emissions.

6. A compression-ignition constant-volume constant-temperature two stage combustion reciprocating internal combustion engine comprising:
    a first combustion stage configured to occur at about constant-volume, wherein a quantity of a first heat addition is selected to ensure that a first combustion temperature during the first combustion stage does not exceed a threshold temperature at which NOx formation occurs; and
    a second combustion stage configured to occur at about a second combustion temperature that remains about constant during the second combustion stage, wherein the second combustion temperature is about equal to the first combustion temperature at the end of the first combustion stage, wherein a quantity and a rate of a second heat addition delivered to the engine during the second combustion stage are configured to ensure that the second combustion temperature of the second combustion stage remains about constant during the expansion stroke even as cylinder pressure decreases.

7. The reciprocating internal combustion engine of claim 6, wherein the compression ratio is equal to the expansion ratio, and wherein the compression ratio is between about 16 and 20.

8. The reciprocating internal combustion engine of claim 6, wherein the engine is configured to operate on a four-stroke cycle or a two-stroke cycle.

9. The reciprocating internal combustion engine of claim 6, wherein the first combustion stage is configured to meet a target loading requirement while the engine is operating at a fuel equivalence ratio of about 0.288 or below.

10. The reciprocating internal combustion engine of claim 6, wherein the first combustion temperature is configured to remain below the threshold temperature at which NOx formation occurs during the first combustion stage, and wherein an equivalence ratio calculated during the first combustion temperature is configured to remain below a NOx formation equivalence ratio.

11. The reciprocating internal combustion engine of claim 6, wherein the engine is created by retrofitting an existing four-stroke diesel engine to operate on the constant-volume constant-temperature two-stage combustion process, the retrofitting comprising reducing a cylinder clearance volume of the existing four-stroke diesel engine to obtain a compression ratio of about 18.0.

12. A method for operating a compression-ignition reciprocating internal combustion engine, the method comprising:
    injecting a first quantity of fuel into a cylinder of the engine during a compression stroke of the engine to produce a first compression-ignition combustion event while a reciprocating piston is at top dead center in the cylinder; and
    injecting a second quantity of fuel into the cylinder during an expansion stroke of the engine to produce a second combustion event while the reciprocating piston is descending from top dead center, wherein injecting the second quantity of fuel has a start and an end, wherein injecting the second quantity of fuel is configured to maintain a constant mean cylinder gas temperature between the start and the end of injecting the second quantity of fuel, wherein injecting the second quantity of fuel has an injection rate, and wherein the injection rate increases between the start and the end of injecting the second quantity of fuel to ensure that the mean cylinder gas temperature remains constant despite the reciprocating piston descending in the cylinder during the expansion stroke.

13. The method of claim 12, wherein the mean cylinder gas temperature of the second combustion event is below about 2400 degrees Fahrenheit.

14. The method of claim 13, wherein the start of injecting the second quantity of fuel occurs when the reciprocating piston is at about top dead center.

15. The method of claim 14, wherein the end of injecting the second quantity of fuel occurs when the reciprocating piston has completed about 3% of the expansion stroke, and wherein the second quantity of fuel is equal to about 28% of the first quantity of fuel.

16. The method of claim 14, wherein the end of injecting the second quantity of fuel occurs when the reciprocating piston has completed about 7% of the expansion stroke, and wherein the second quantity of fuel is equal to about 52% of the first quantity of fuel.

17. The method of claim 14, wherein the end of injecting the second quantity of fuel occurs when the reciprocating piston has completed about 14% of the expansion stroke, and wherein the second quantity of fuel is equal to about 72% of the first quantity of fuel.

18. The method of claim 14, wherein the end of injecting the second quantity of fuel occurs when the reciprocating piston has completed about 24% of the expansion stroke, and wherein the second quantity of fuel is equal to about 90% of the first quantity of fuel.

19. The method of claim 14, wherein the end of injecting the second quantity of fuel occurs when the reciprocating piston has completed about 39% of the expansion stroke, and wherein the second quantity of fuel is equal to about 104% of the first quantity of fuel.

20. The method of claim 13, wherein the engine has a compression ratio between about 16 and 20.

\* \* \* \* \*